United States Patent
Van Der Wel

(10) Patent No.: US 6,573,662 B2
(45) Date of Patent: Jun. 3, 2003

(54) PLASMA ADDRESSED DISPLAY DEVICE WITH A FUNCTION OF CONTROLLING PARTIAL PRESSURE OF DOPANT GAS

(75) Inventor: Pieter Van Der Wel, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/048,861
(22) PCT Filed: Jun. 13, 2001
(86) PCT No.: PCT/EP01/06750
§ 371 (c)(1),
(2), (4) Date: Feb. 4, 2002
(87) PCT Pub. No.: WO01/97249
PCT Pub. Date: Dec. 20, 2001

(65) Prior Publication Data
US 2003/0006711 A1 Jan. 9, 2003

(51) Int. Cl.[7] .............................. G02F 1/133; G09G 3/10
(52) U.S. Cl. ................................. 315/169.4; 315/169.1; 359/54
(58) Field of Search .......................... 315/169.4, 169.1; 313/582, 517, 484, 491, 586; 359/54, 87

(56) References Cited

U.S. PATENT DOCUMENTS

| | | | | |
|---|---|---|---|---|
| 5,667,705 A | * | 9/1997 | Miyazaki et al. | 219/121.52 |
| 5,764,001 A | * | 6/1998 | Khan et al. | 313/582 |
| 5,804,920 A | * | 9/1998 | Khan et al. | 313/582 |
| 5,868,811 A | * | 2/1999 | Khan et al. | 65/36 |
| 6,433,471 B1 | * | 8/2002 | Khan et al. | 313/483 |

FOREIGN PATENT DOCUMENTS

| | | | |
|---|---|---|---|
| EP | 0816898 | 1/1998 | ........... G02F/1/133 |
| EP | 0833363 | 4/1998 | ........... H01J/17/49 |
| WO | WO9967770 | 12/1999 | ........... G06F/9/313 |

* cited by examiner

Primary Examiner—Don Wong
Assistant Examiner—Chuc Tran

(57) ABSTRACT

Object: The object of the invention is to provide a plasma addressed display device which can adapt the amount of dopant gas released or absorbed by the storage material to a changing real-operating/environment conditions of the display device in order to control the partial pressure of the dopant gas in the channel.

Configuration: A plasma addressed display device comprising: a channel substrate (2) provided with an array of interconnected longitudinal channel chambers; a cover sheet (4) extending over the channel chambers (30) and making seals to the channel chambers on a side of an upper face of the chamber, whereby the channel substrate and the cover sheet define sealed channel chambers; a pair of electrodes (3a,3c) located in each sealed channel chamber for selectively ionizing a gas within the channel chamber; a dopant source (53) having a storage material that reversibly absorbs and releases a dopant gas to be mixed with a primary ionizable gas in the sealed channel chambers; and a heater (5H) for heating the storage material. The device is provided with a feedback loop (100–103, 5H) for a control of partial pressure of the dopant gas within the sealed channel chambers, the feedback loop comprising: measurement means (100,101) for measuring a value of a decay time of an electrical conductivity in at least one of the channel chambers from turning off the plasma in the channel chamber; and control means (102, 103) for controlling a temperature of the storage material through the heater on the basis of the measured value so that the decay time is within a predetermined range.

5 Claims, 5 Drawing Sheets

PLASMA ADDRESSED DISPLAY DEVICE WITH A FUNCTION OF CONTROLLING PARTIAL PRESSURE OF DOPANT GAS

DESCRIPTION OF THE INVENTION

1. Field of the Invention

The present invention generally relates to a plasma addressed display (PAD) device having an electro-optical part. The invention more particularly relates to a plasma addressed liquid crystal (PALC) display device comprising plasma channels for addressing a liquid crystal layer used as the electro-optical part, the channels being filled with a mixture of main ionizable gas and its dopant gas.

2. Prior Art

PALC displays of such a type are well known from European patent publications Nos. EP 0 816 898 A2 and EP 0 833 363 A2 and so on.

The former describes a PALC display device with an integrated source of reactive gas. Said integrated source comprises a body of a storage material which is capable of storing a dopant gas to be mixed into a primary ionizable gas in plasma channels and reversibly absorbs and releases the dopant gas. In this display device, use of the source allows an equilibrium to be established between concentration of the dopant gas in the body of the storage material and partial pressure of the dopant gas in the plasma channels. This enables to keep the partial pressure of the dopant gas constant in the plasma channels. Hydrogen (H) is typically used for said dopant gas, and helium (He) is typically used for said main ionizable gas.

The latter also describes a PALC display panel comprising a source of dopant gas similar to the source mentioned above, but further comprising an electrical resistance heater to improve performance of the source. The heater is used to heat the storage material of the source and elevate the partial pressure of hydrogen in the panel so that the equilibrium is established between the concentration of hydrogen in the storage material and the partial pressure of hydrogen in the panel. In this manner, it is possible to achieve and maintain the desired partial pressure of hydrogen in the panel even though the storage material has initially lower concentration of hydrogen. Alternatively, or in addition, use of the heater allows the useful life of the panel to be prolonged. That is because the use of the heater can delay the time at which the partial pressure of hydrogen in the panel falls below a desired value for reason of the limits of the storage material's natural ability, by virtue of increasing the temperature of the storage material.

However, this prior art of EP 0 833 363 A2 does not suggest how to heat the storage material and in particular does not operate the storage material and heater with precision. Hydrogen in channels is consumed by various largely unknown parameters not only during normal operation of the display but also during off time of the display device, namely during all over the lifetime. It is, therefore, very important to adapt the amount of hydrogen released or absorbed by the storage material to a changing real-operating/environment conditions of the display device. If the amount of hydrogen to be adapted to the conditions were too small, a lower hydrogen partial pressure might be applied to the channels, which may lead to too long decay times of the channels and a deteriorated addressing of the line pixels (line-sequentially addressing operation).

A decay time refers to a conductivity transition period starting from turning off the plasma in a channel, during which the plasma conductivity caused by the plasma returns to, i.e., transits to substantially zero. It can be also said that the decay time depends on a switching speed of the gas filling in the channel from ON-state to complete OFF-state in that channel. The too long decay time must be avoided especially for displays having a large number of scanning lines such as HDTV displays and computer monitors because a period of time assigned for one scanning line is shorter in such types of displays.

THE OBJECT OF THE INVENTION

It is, therefore, an object of the present invention to provide a plasma addressed display device which can adapt the amount of dopant gas released or absorbed by the storage material to a changing real-operating/environment conditions of the display device in order to control the partial pressure of the dopant gas in the channel.

It is another object of the present invention to provide a plasma addressed display device which can operate by a faster switching gas supplied to plasma channels.

SUMMARY OF THE INVENTION

For achieving the above-mentioned objects, a plasma addressed display device according to the present invention comprises:

a channel substrate provided with an array of interconnected longitudinal channel chambers;

a cover sheet extending over the channel chambers and making seals to the channel chambers on a side of an upper face of the chamber, whereby the channel substrate and the cover sheet define sealed channel chambers;

a pair of electrodes located in each sealed channel chamber for selectively ionizing a gas within the channel chamber;

a dopant source having a storage material that reversibly absorbs and releases a dopant gas to be mixed with a primary ionizable gas in the sealed channel chambers; and a heater for heating the storage material, which is CHARACTERIZED in that there is provided a feedback loop for a control of partial pressure of the dopant gas within the sealed channel chambers, the feedback loop comprising:

measurement means for measuring a value corresponding to a decay time of an electrical conductivity in at least one of the channel chambers from turning off the plasma in the channel chamber; and control means for controlling a temperature of the storage material through the heater on the basis of the measured value so that the decay time is within a predetermined range.

According to the plasma addressed display device having the above-mentioned structure, it is possible to adjust and optimize an amount of the dopant gas released from the storage material in accordance with changes of the real decay time of the channel conductivity by controlling the temperature of the storage material, like a servo system. That is, regardless any conditions of the display a feedback control can be realized, which exactly maintains a desired partial pressure of the dopant gas in the channel chambers. The device according to the invention, therefore, offers an advantage in that the display operation, especially the line-sequentially scanning operation can be maintained appropriately over the lifetime. It further offers an advantage in that a shorter time is required for addressing each line, and the device becomes easy to be adapted for displays in which an assigned scanning time per line is shorter, e.g., HDTV displays and computer monitors since the channel chamber can be filled with the gas faster in switching.

In the display device, the measurement means may perform its measurement by sensing the amount of space charges remained in at least one of the channel chambers a predetermined time after plasma discharge has been completed in the channel chamber.

The measurement means may comprise: a switching circuit for changing a current path of one of the electrodes between first and second outputs thereof; and a capacitor connected to the first output, the second output being coupled to a reference potential for plasma discharge in the chambers, the switching circuit changing the current path from the second output into the first output in response to completion of a plasma-ignition pulse which is applied to the other of the electrodes.

The measurement means may further comprise means for measuring a voltage across the capacitor and for generating a decay time signal showing the decay time length in accordance with the measured voltage.

Furthermore, the control means may comprises: a comparator for comparing a value of the decay time signal with a predetermined reference value to generate a control signal according to a result of the comparison; and a driver for generating a drive signal in accordance with the control signal to supply the heater.

Embodiment of the Invention

The above-mentioned aspects and the other aspects according to the present invention will be more specifically described with reference to the accompanying drawings.

DESCRIPTION OF THE PREFERRED EMBODIMENTS

Figure 1:
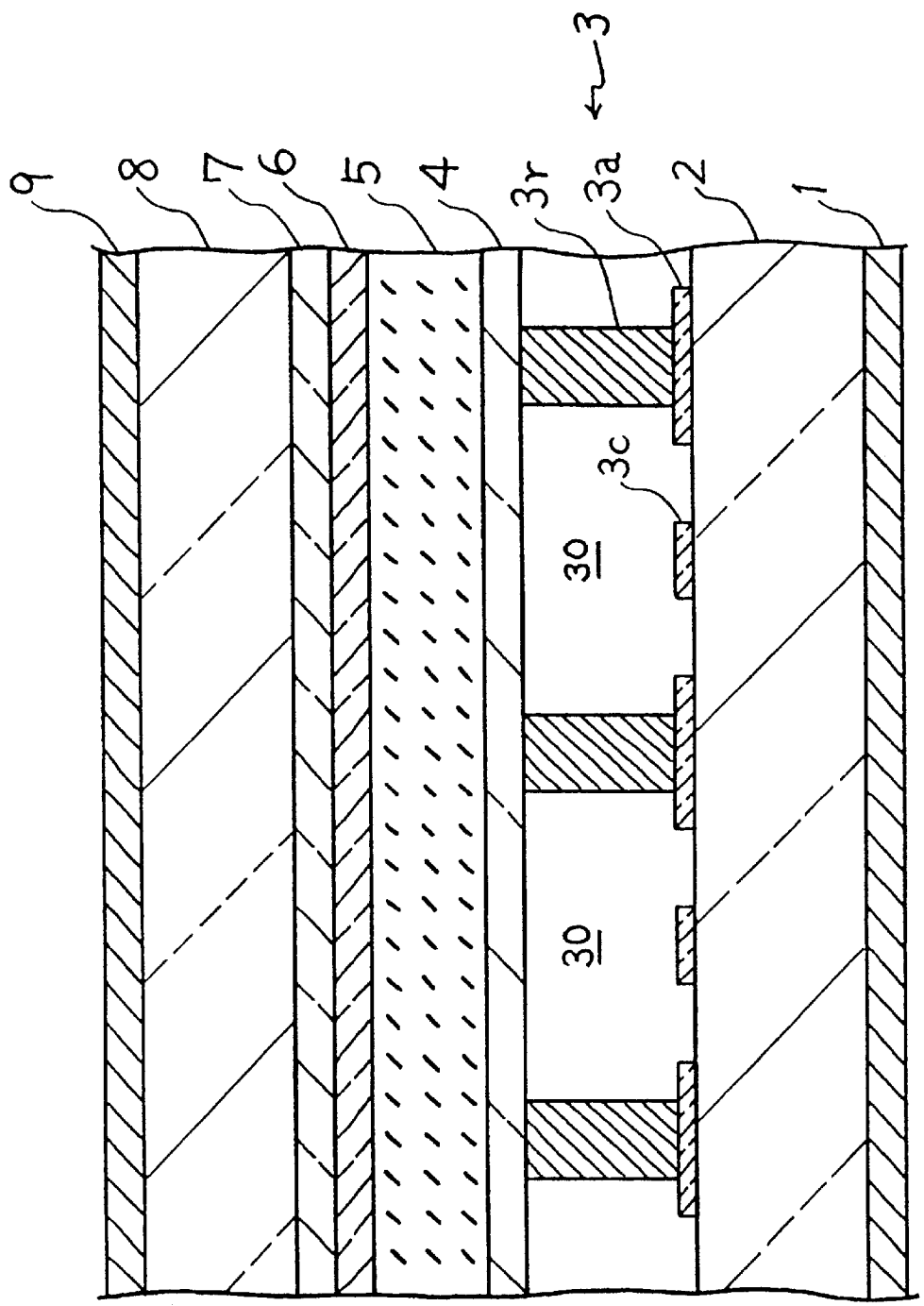
FIG. 1 is a sectional view showing a PALC display panel applied to one embodiment of the present invention.

FIG. 1 schematically shows a section view of a part of a PALC display panel of one embodiment according to the present invention. The PALC display panel comprises, in the order from the bottom side of this figure, a first polarizer 1, a channel substrate 2, a channel chamber layer 3, a micro-sheet 4 of dielectric material, a liquid crystal (LC) layer 5 as an electro-optical material layer, parallel transparent data electrodes 6 (only one of which is shown in this figure), a color filter layer 7, an upper substrate 8 carrying the data electrodes 6 and color filter layer 7, and a second polarizer 9. Facing to the bottom polarizer 1, there may be located a well-known, plate-shaped back-light system (not shown in this figure). The back-light system includes a light source for emitting back-light and a diffuser layer for making uniform light to be incident on the polarizer 1 from the emitted light.

The channel substrate 2 is made, e.g. from glass and is provided with a plurality of longitudinal channel chambers 30 in its upper main face side. These chambers 30 are delimited by rib-structure of ribs 3r and anode electrodes 3a stacked on the substrate 2. The micro-sheet 4 covers over the rib-structure to define sealed channel chambers. The channel chambers 30 are filled with the mixture of a main ionizable gas, for example, of helium (He) and a dopant gas thereof, for example, of hydrogen (H). The chambers 30 extend horizontal in a display area and in parallel to each other. Each of the chambers 30 is provided with an anode electrode 3a and a cathode electrode 3c extending parallel to each other along the channel chamber and being located at a predetermined distance. The anode electrodes 3a are used in common as grounded electrodes, whereas the cathode electrodes 3c are used individually as strobe electrodes. The channel chambers 30 are in a form of an array orthogonal to the data electrodes 6 which extend vertical in the display area.

Figure 2:
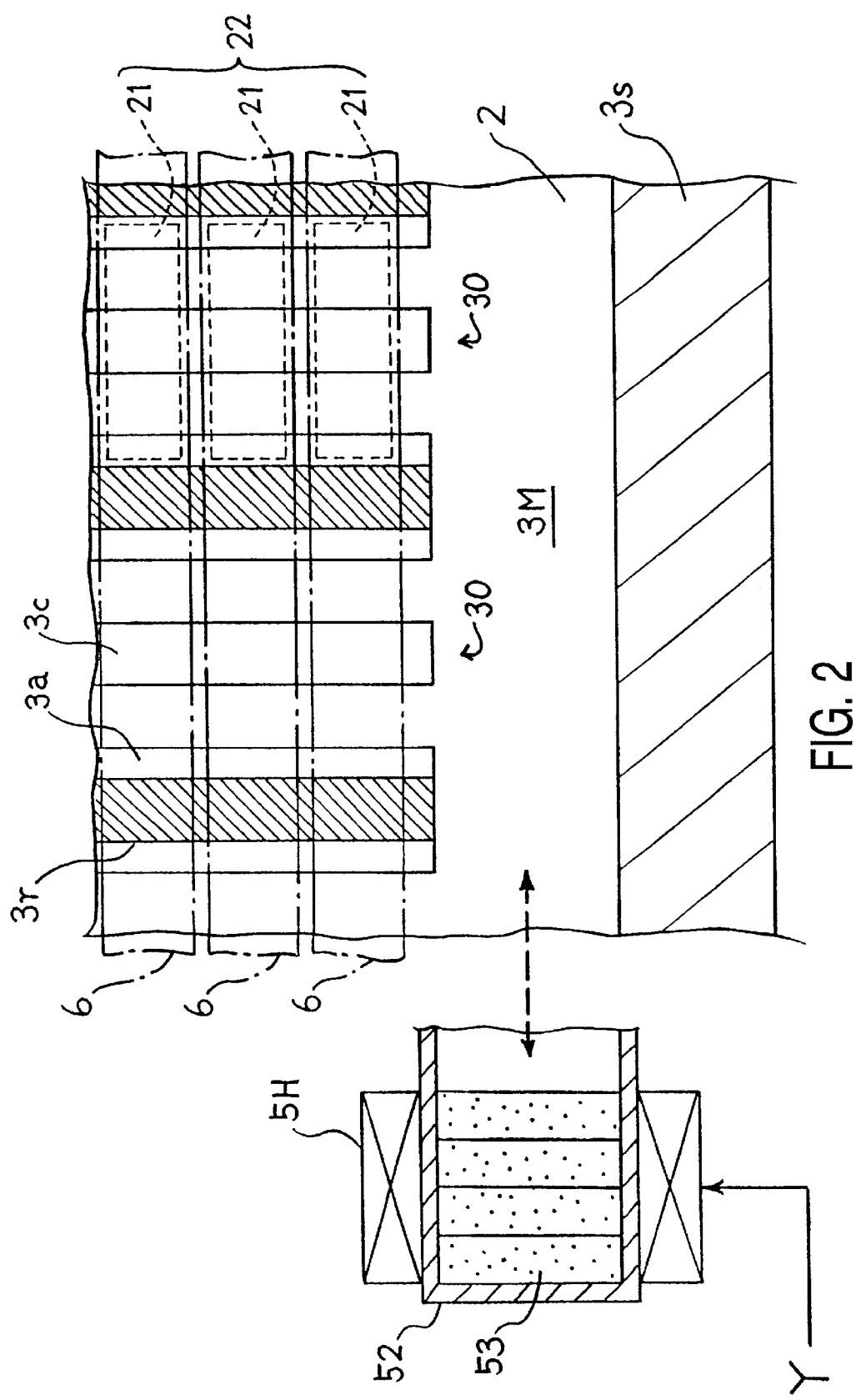
FIG. 2 is a plan view which illustrates an arrangement of channels, data electrodes, dispenser system, pixels and etc. in the display panel shown in FIG. 1.

When one views a display screen of the display panel perpendicularly, each of discrete pixel elements (sub-pixels) 21 occupies the region where one of the data electrodes 6 crosses one of the channel chambers 30 (see FIG. 2). The pixel elements 21 correspond to three primary colors, i.e., red (R), green (G) and blue (B), respectively. The neighbour R, G and B pixel elements 21 constitute a single full-color pixel 22, which are arranged, in this example, in a longitudinal direction of the channel chamber 30 for each full-color pixel. The R, G and B pixel elements 21 are associated with R, G and B color filters respectively, thereby accomplishing full-color displaying for each of the color pixels. It is noted that the FIG. 1 does not show such RGB structure of the color filter 7.

When a suitable voltage (e.g. about 450V) is applied between the anodes 3a of both sides and the cathode 3c in one of the channel chambers 30, the gas in that channel chamber forms plasma. The plasma provides a conductive path of the corresponding line at the bottom surface of the micro-sheet 4 to the anodes 3a. Namely, the line-shaped portion of the micro-sheet 4, corresponding to the chamber is virtually connected to the anodes 3a, which may be at ground potential. Immediately after the plasma has been extinguished, if one of the data electrodes 6 is at ground potential, there is substantially no electric field in the portion of the LC layer 6 between the one data electrode and the channel chamber 30. Accordingly, the pixel element 21 corresponding to the LC portion is considered to be OFF. On the contrary, if one of the data electrodes 6 is at a substantially different potential from the anode potential (which may be a ground potential), an electric field is applied across the LC portion in accordance with the different potential. Accordingly, the pixel element 21 corresponding to the LC portion is considered to be ON.

The first polarizer 1 may be a linear polarizer, and its plane of polarization can be arbitrarily designated as being at 0° relative to a reference plane. With this first polarizer 1, the second polarizer 9 may be a linear polarizer having its plane of polarization at 90° relative to the reference plane, and the LC layer 5 may be comprised of a twisted nematic liquid crystal material that rotates the plane of polarization of linearly polarized light incident thereon by an angle that is a function of the electric field being applied across the liquid crystal material. Under an OFF-control of the pixel element 21, the angle of rotation is 90°, but under an ON-control of the pixel element 21, it is zero.

The above-mentioned back-light system has light source that emits unpolarized light to the diffuser layer included in the system. The diff-user layer has a scattering surface for uniform illumination over the display plane or screen of the display panel. The light via the diffuser layer from the light source is linearly polarized at 0° by the first polarizer 1 and then may be passed through the respective layers 2–8 toward the viewer facing to the polarizer 9.

In the case of fully bright state, the plane of polarization of linearly polarized light is rotated through 90° through the LC layer 5. Therefore, the plane of polarization of light incident on the second polarizer 9 is at 90°, whereby the incident light is passed by the front polarizer 9 to illuminate an area of the corresponding pixel element 21.

In the case of fully dark state, the plane of polarization of the linearly polarized light is not rotated through the LC layer 5. Thus, the plane of polarization of the light incident on the second polarizer 9 is at 0°, whereby this light is blocked by the front polarizer 9 to darken an area of the corresponding pixel element 21.

When intensity of the electric field across the LC layer 5 is intermediate between a value of the bright state and a value of the dark state, the light is passed by the second polarizer 9 in accordance with the intensity of the electric field. This allows a gray scale image to be displayed.

FIG. 2 shows an arrangement of the channel chambers, the data electrodes and the pixels, as well as a dispenser system provided in the PALC display panel. The plasma channels 30 communicate with a manifold channel chamber 3M so as to be interconnected, thereby enabling the gas to flow from the chambers 30 into the manifold channel chamber 3M and to flow otherwise. The manifold channel chamber 3M also communicates with an exhaust tube (not shown) which is connected with a container 52. The container 52 and the exhaust tube are tightly coupled to each other.

The container 52 contains tablets 53 of hydrogen storage material as mentioned above. The hydrogen storage material stores hydrogen by incorporating the hydrogen into the molecular structure of itself. Such hydrogen storage materials are well-known and commercially available used as hydrogen getters, as also described in the above-mentioned publications.

A heating system 5H is provided around the container 52 and can heat the storage material through the container body wall. Although hydrogen storage material naturally releases hydrogen by its own temperature, the heating system 5H can accelerate the release of hydrogen from the material. The released hydrogen gas is passed through the exhaust tube and the manifold channel 3M to the respective channel chambers 30, wherein the hydrogen is mixed with helium gas.

Figure 3:
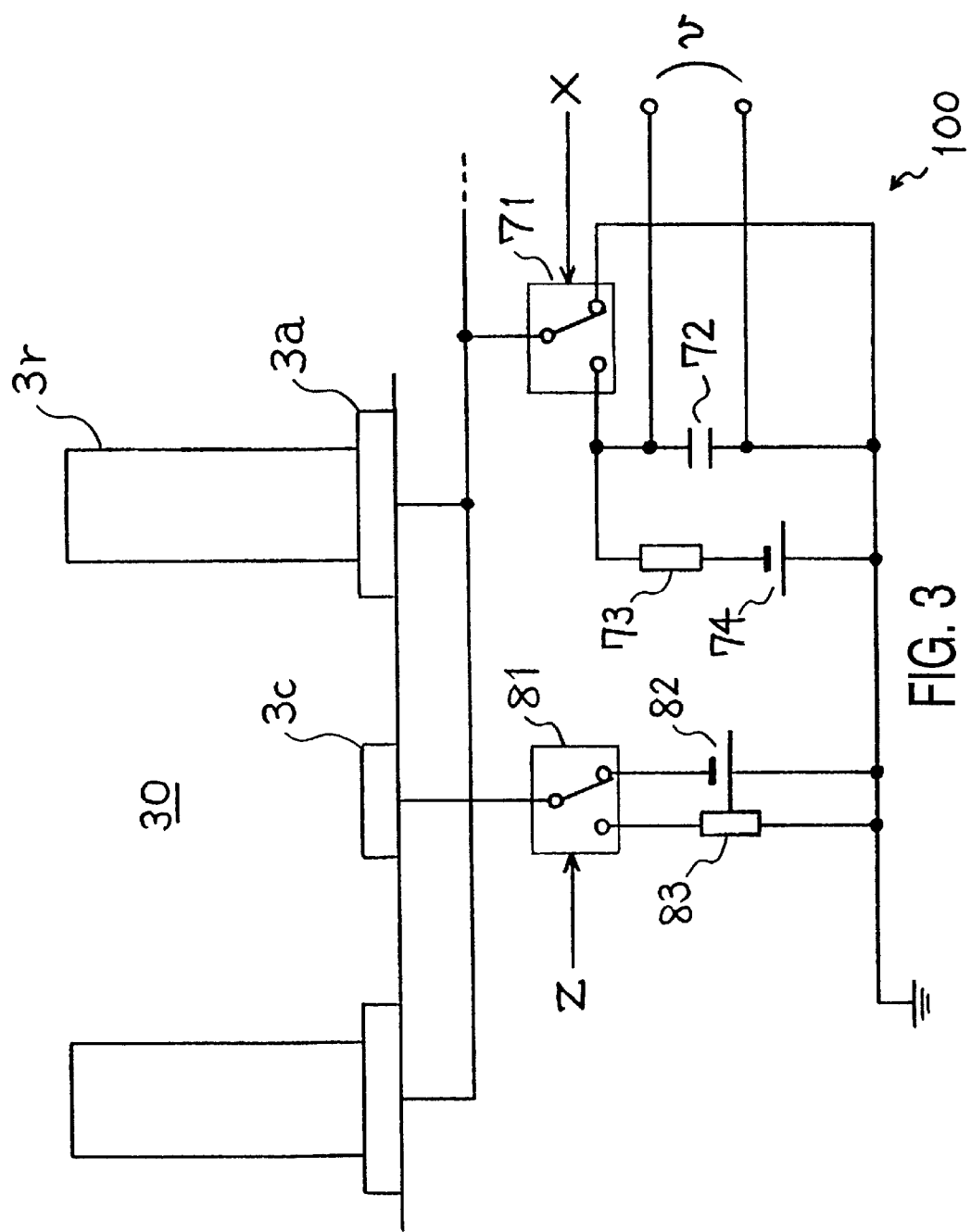
FIG. 3 is a schematic diagram of a measurement circuit in the display panel according to an embodiment of the present invention.

FIG. 3 shows a circuit 100 for measuring a value of the decay time, which comprises a switch circuit 71, capacitor 72 and a series arrangement of resistor 73 and direct current supply 74. The switch circuit 71 has one input and two outputs, the input being connected to the anodes 3a and the outputs being connected to the ground and the capacitor 72 respectively. One end of the capacitor 72 and one of the outputs of the switch circuit 71 are commonly connected to one end of the resistor 73. The resistor 73 includes an internal resistance of the switch circuit 71 having a substantially large value. Another end of the resistor 73 is connected to a negative terminal of the supply 74, and a positive terminal of the supply 74 is connected to the ground. The supply 74 may have a voltage of, e.g., 20V, and the capacitor 72 may have a relatively small capacitance.

The pair of ends of the capacitor 72 are led to the outputs for supplying a voltage signal v as a signal representing a decay time of channel conductivity. It is noted that: whereas every anode of the conventional PALC display device is essentially directly connected to a ground, at least one anode of this embodiment is connected to the switch circuit 71 which can change a current path of an anode from/to the ground side to/from the capacitor side.

On the other hand, the cathode 3c is also connected to a switch circuit 81. This switch circuit 81 is a 1-in and 2-out type, the output being connected to the cathode 3c and the inputs being connected to a direct current supply 82 and an internal resistor 83 of the switch circuit 81 respectively. The supply 82 is connected at its negative terminal to one input of the switch circuit 81 and at its positive terminal to the ground. The resistor 83 is connected at one end to another input of the switch circuit 81 and at another end to the ground. The supply 82 has a comparatively high voltage for discharge ignition, e.g., 450V. The switch circuit 81 is controlled by a signal Z and can switch a current path of the cathode 3c from the supply 82 side to the resistor 83 side and also otherwise. By such switching, a negative pulse is generated to the cathode 3c in order to make plasma discharge in the concerned channel chamber. These functional blocks 81–83 are essentially the same as those of the conventional PALC display device.

Figure 4:
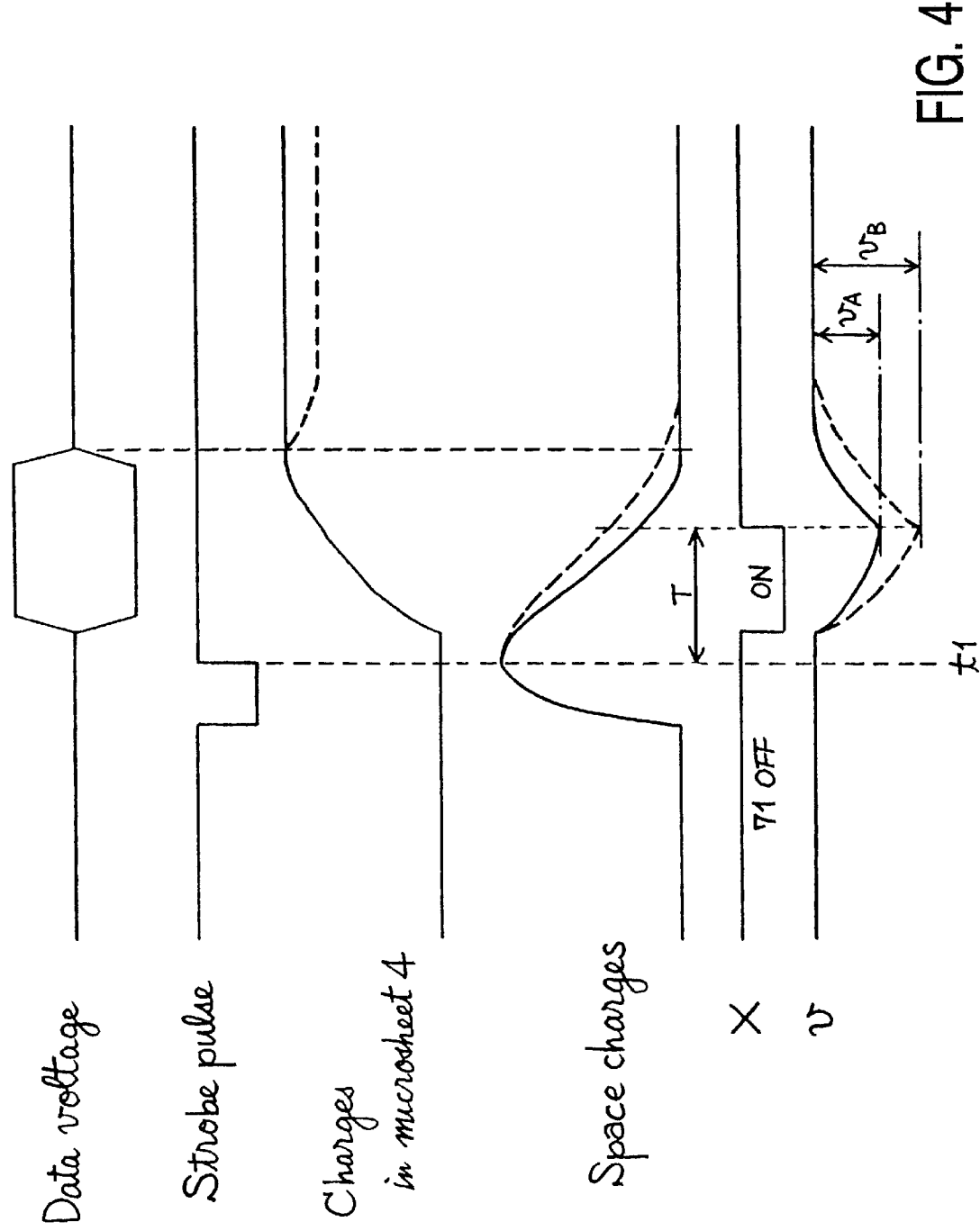
FIG. 4 is a time chart showing potential waveforms of respective portions of the display panel according to the embodiment of the present invention.

FIG. 4 shows potential waveforms at portions of the PALC display panel as mentioned above. The time chart in this figure mainly covers one scanning line operation of the display.

At first, to make discharge a negative voltage strobe pulse is applied to the cathode 3c in one of the channel chambers 30 corresponding to a line of pixels to be freshly activated (hereinafter called an active line). In response to the strobe pulse, plasma arises in the chamber 30 to discharge between the cathode 3c and the anodes 3a in the chamber. This plasma under application of the strobe pulse causes a large amount of space charges in that channel, so that virtual electrode is made on the bottom surface of the micro-sheet 4 and is substantially electrically connected to the anodes 3a. When the strobe pulse has been removed (time point t1), the plasma is extinguished and the space charges come to be reduced.

As soon as the strobe pulse has been removed, the data electrodes 6 are respectively (simultaneously) driven to voltage levels that depend on the respective sample values of the active line of the frame/field of a video signal. For each of the pixel elements 21 corresponding to the chamber 30 of the active line, an electric field that defines the state of the pixel element is created between the data electrode 6 and the bottom surface of the micro-sheet 4. Such an electric field causes the LC layer 5 and micro-sheet 4 to be charged.

Even if the plasma has been extinguished, the charged state must persist in the pixel element portions of the LC layer 5 and micro-sheet 4 so that the optical state of the LC portion of the pixel element is maintained until that chamber 30 is again addressed for the next frame/field of the video signal. To this end, the data voltages at the data electrodes 6 should be kept unchanged until the space charges disappear.

During driving of the data electrodes 6, portions of the micro-sheet 4 of this active line are respectively charged by the voltages applied to the electrodes 6. Ideally, after the end of driving the data electrode 6, the portions of the micro-sheet 4 should hold the charges constant until the gas in this channel is activated again for the next frame. However, the virtual electrode formed in the bottom surface of the micro-sheet 4 has a possibility to lose charges (and voltage) when the data voltage is turned off, as shown by a dotted line in FIG. 4. This decrease of charges is caused by the space (free) charges still being present or created via metastables in the discharge area, namely within the channel chamber. In other words, if there are remained substantially some space charges in the chamber when the data voltage is off (see a dotted line in FIG. 4), they affect the micro-sheet 4 to reduce the held charges in it. The more the space charges are remained in the chamber at the end of addressing event, the more the charges in the micro-sheet 4 are decreased. Furthermore it can be said that the conductivity of the channel depends on an amount of the remained space charges. It can be considered that the amount of the remained space charges a predetermined time T after the plasma discharge has been finished in the channel represents a length of the decay time of the conductivity of the channel. The predetermined time may be preferably in a range of 5 to 50 microseconds.

So, the present invention is intended to measure the decay time of the channel conductivity on the basis of recognition of such a view.

In this embodiment, the above-mentioned blocks 71–74 help to perform detection of the amount of the remained space charges after turning-off of the strobe pulse on the cathode 3c in order to measure the decay time. As shown in FIG. 4, after a rising edge of the strobe pulse, switch circuit 71 is controlled to ON, that is, its connection is changed from the ground into the capacitor 72 side. Under this control, the capacitor 72 can attract the remained space charges within the chamber 30 through the anodes 3a. Practically, the voltage v across the capacitor 72 decreases in accordance with the space charges, as shown in FIG. 4. This decrease of the voltage is a measure for the decay time or a measure for the switching speed of the gas within the channel chamber. To measure the decrease of the voltage, a voltage measurement circuit is used, which receive the voltage v across the capacitor 72.

Figure 5:
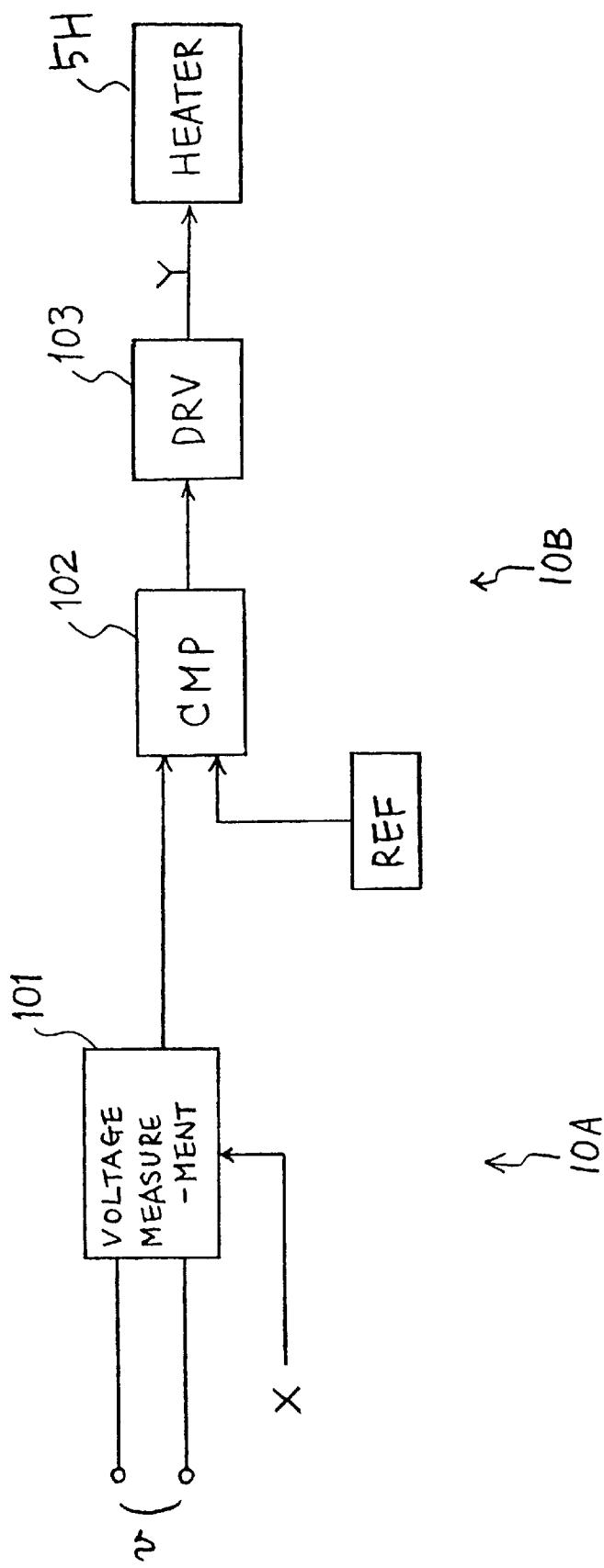
FIG. 5 is a conceptual block diagram showing a rough composition of a feedback circuit in the display panel according to the embodiment of the invention.

FIG. 5 schematically shows a feedback circuit including a voltage measurement circuit 101. In the feedback circuit, the circuits 100 and 101 serve as means 10A for measuring a decay time of channel conductivity. The feedback circuit further comprises means 10B for controlling the heater system 5H in accordance with values measured by the means 10A.

The voltage measurement circuit 101 may have a terminal receiving a control signal X for the switch circuit 71. It can appropriately measure the decrease or drop of the voltage v mentioned above by using the signal X. That is: at the beginning of the ON-state of the signal X the voltage measurement circuit 101 can capture the initial potential of the capacitor 72 (which is due to the pre-charging by the supply 74); and at the end of the ON-state of the signal X it can capture the resultant voltage of the capacitor representing the decay time by using the initial potential as a reference voltage. For example, in the case of appropriate decay time, the circuit 101 can determine the voltage $V_A$, and in the case of longer decay time, it can determine the voltage VB, as shown in FIG. 4. Preferably, the circuit 101 has a function of holding the value of the determined voltage until the next ON-state of the signal X.

The determined voltage (alternatively called a decay time signal) from the circuit 101 is supplied to a comparator 102. The comparator 102 receives the decay time signal at its one input terminal. The other input terminal of the comparator 102 is supplied with a reference voltage which can be a criterion as to whether the decay time length is too long or not. If the decay time signal has a value equal to or smaller than the reference voltage value, the comparator 102 outputs a low level signal. On the other hand, if the decay time signal has a value larger than the reference voltage value, the comparator 102 outputs a high level signal. By setting a value of the reference voltage, the range of the desired decay time can be defined.

A driver 103 supplies the above-mentioned heater system 5H with a driving current in accordance with the output signal of the comparator 102. For example, the driver 103 supplies drive current Y having a predetermined level to the heater system 5H for a certain period of time only if the output signal of the comparator 102 is at the high level. Accordingly, the heater system 5H can increase the temperature of the storage material of the tablet 53 in the container 52 by the power corresponding to the amount of the drive current Y. In this way, it is possible to control the heater system 5H based on a real decay time of the channel conductivity and to automatically adjust the temperature of the storage material, so that the amount of the released hydrogen is optimised, that the partial pressure of hydrogen in the channel chamber is also optimized and that the decay time is short enough.

It is noted that a whole mechanism of such a feedback-loop does not have to be very quick because the whole heating and diffusion mechanism will be slow too.

The measurement mechanism as mentioned above can also be used during manufacturing process of the display device in order to check whether the plasma channel in the panel is functioning all right.

It will be appreciated that modifications may be made in our invention. For example, the circuit 100 can be provided for a plurality of channels. In this case the control means 10B can use a plurality of measurement values to control the heater. Preferred embodiments described herein are therefore illustrative and not restrictive, the scope of the invention being indicated by the appended claims and all variations which come within the meaning of the claims are intended to be embraced therein.

What is claimed is:

1. A plasma addressed display device comprising:
    a channel substrate provided with an array of interconnected longitudinal channel chambers;
    a cover sheet extending over the channel chambers and making seals to the channel chambers on a side of an upper face of the chamber, whereby the channel substrate and the cover sheet define sealed channel chambers;
    a pair of electrodes located in each sealed channel chamber for selectively ionizing a gas within the channel chamber;
    a dopant source having a storage material that reversibly absorbs and releases a dopant gas to be mixed with a primary ionizable gas in the sealed channel chambers; and
    a heater for heating the storage material,
    which is CHARACTERIZED in that there is provided a feedback loop for a control of partial pressure of the dopant gas within the sealed channel chambers, the feedback loop comprising:
        measurement means for measuring a value corresponding to a decay time of an electrical conductivity in at least one of the channel chambers from turning off the plasma in the channel chamber; and control means for controlling a temperature of the storage material through the heater on the basis of the measured value so that the decay time is within a predetermined range.

2. A display device according to claim 1, CHARACTERIZED in that the measurement means perform its measurement by sensing the amount of space charges remained in at least one of the channel chambers a predetermined time after plasma discharge has been completed in the channel chamber.

3. A display device according to claim 2, CHARACTERIZED in that the measurement means comprise:

a switching circuit for changing a current path of one of the electrodes between first and second outputs thereof; and a capacitor connected to the first output, the second output being coupled to a reference potential for plasma discharge in the chambers, the switching circuit changing the current path from the second output into the first output in response to completion of a plasma-ignition pulse which is applied to the other of the electrodes.

4. A display device according to claim 3, CHARACTERIZED in that the measurement means further comprise means for measuring a voltage across the capacitor and for generating a decay time signal showing the decay time length in accordance with the measured voltage.

5. A display device according to claim 4, CHARACTERIZED in that the control means comprises:

a comparator for comparing a value of the decay time signal with a predetermined reference value to generate a control signal according to a result of the comparison; and a driver for generating a drive signal in accordance with the control signal to supply the heater.

* * * * *